Feb. 7, 1939.　　　H. L. HUEY　　　2,146,338
CULTIVATOR SHIELD
Filed Dec. 29, 1937　　　2 Sheets-Sheet 1
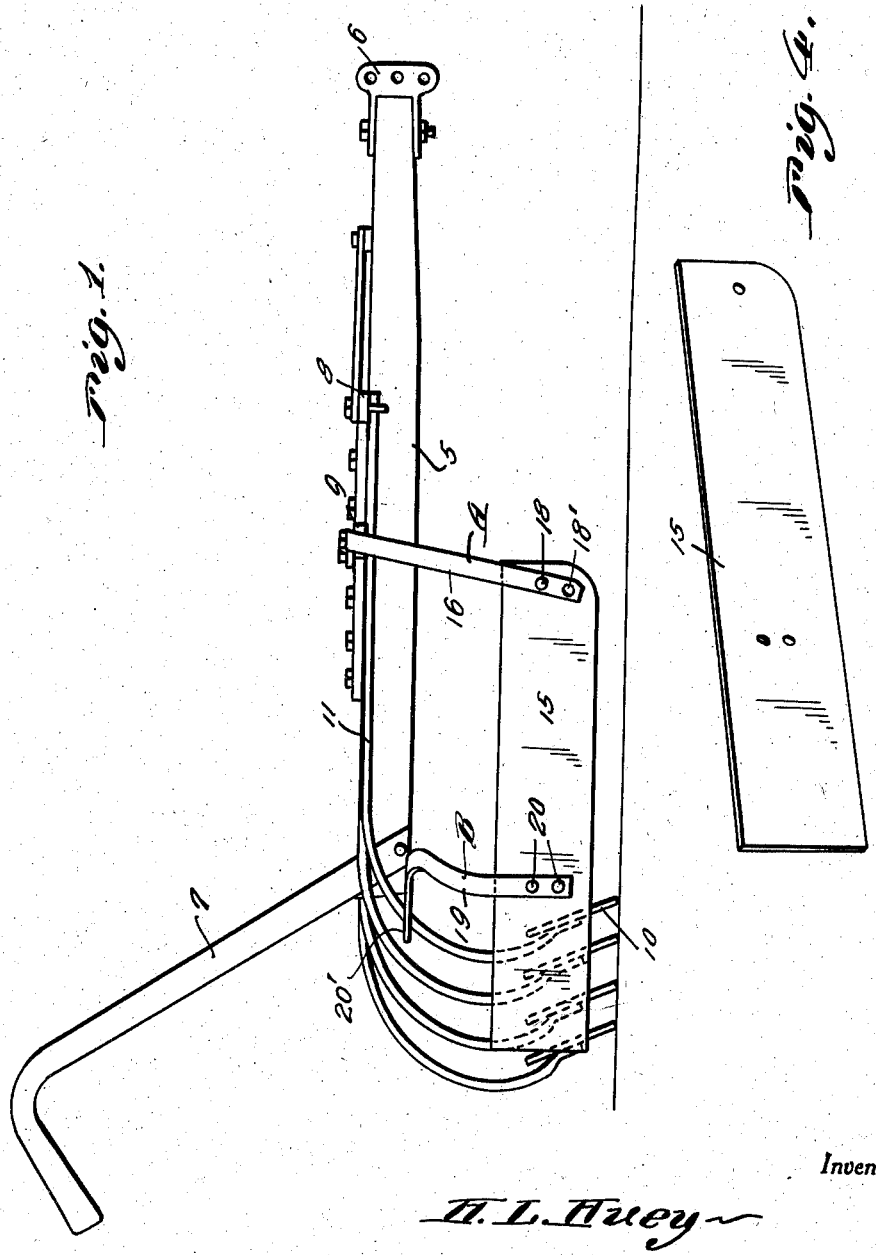
Inventor
H. L. Huey
By Clarence A. O'Brien
Attorneys Feb. 7, 1939.     H. L. HUEY     2,146,338
CULTIVATOR SHIELD
Filed Dec. 29, 1937     2 Sheets-Sheet 2
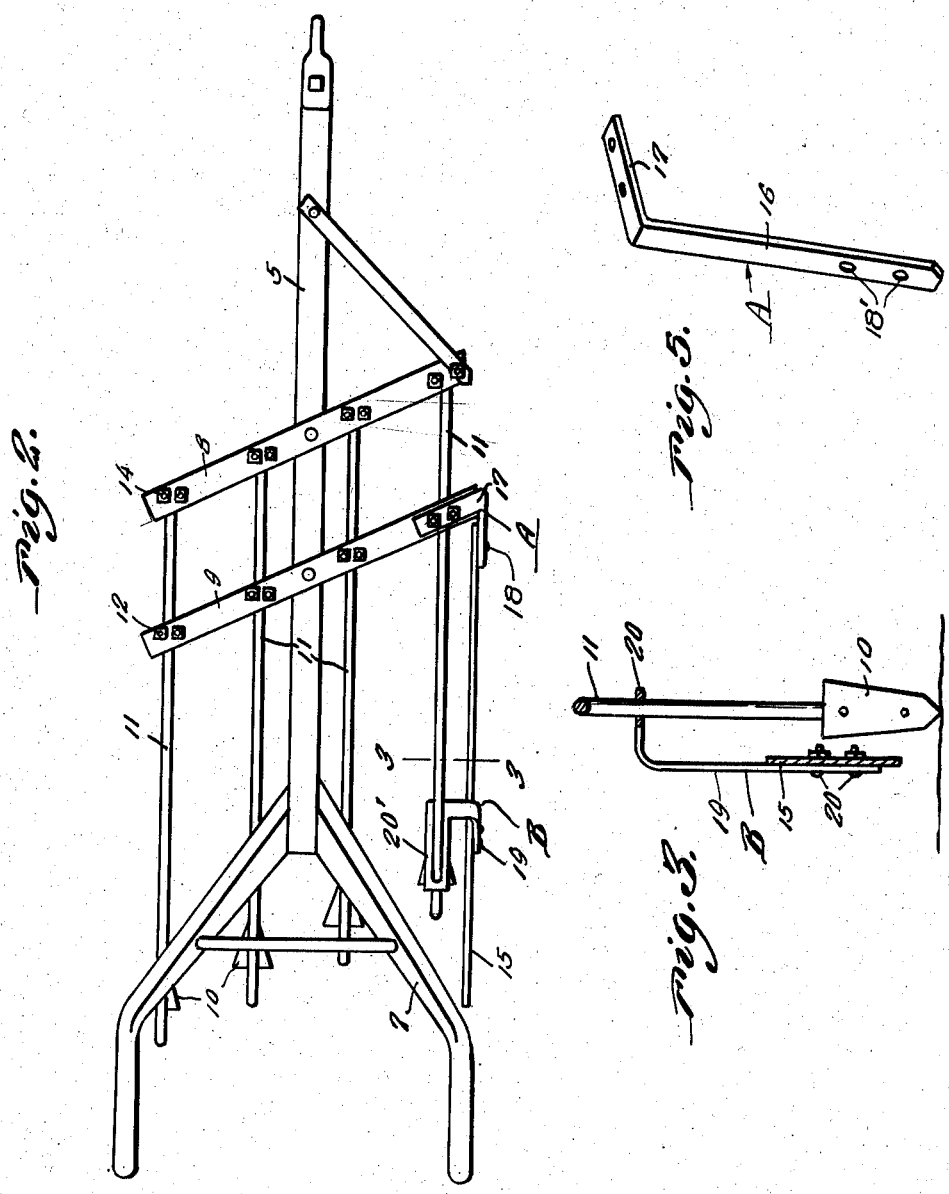
Inventor
H. L. Huey
By Clarence A. O'Brien
Attorneys Patented Feb. 7, 1939

2,146,338

UNITED STATES PATENT OFFICE 2,146,338

CULTIVATOR SHIELD

Henry L. Huey, Atlanta, Ga.

Application December 29, 1937, Serial No. 182,328

1 Claim. (Cl. 97—188)

The present invention relates to certain new and useful improvements in cultivator shields of that type which are intended to be attached to spring tooth cultivators.

The primary object of the invention resides in the provision of a shield for spring tooth cultivators of such construction that lumps of soil are prevented from reaching the plants while fine dirt can reach the plants.

A further important object of the invention resides in the provision of a cultviator shield of this nature which is inexpensive to manufacture, and also to incorporate, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a side elevation of a spring tooth cultivator showing my shield mounted thereon.

Figure 2 is a top plan view thereof.

Figure 3 is a detail vertical sectional view taken substantialy on the line 3—3 of Figure 2.

Figure 4 is a perspective view of the shield.

Figure 5 is a perspective view of a bracket.

Referring to the drawings in detail it will be seen that the numeral 5 denotes a beam with the clevis 6 at the forward end and handle bars 7 at the rear end. The numerals 8 and 9 denote cross bars fixed on the beam 5. These bars extend diagonally across the beam and are equidistant from each side thereof in spaced parallel coextensive relation. Numerals 10 denote cultivator blades mounted on the ends of shanks 11, which have their terminals fixed by U-bolts or the like 12 and 14 to the cross bars 9 and 8, respectively. Thus, the blades are arranged in a diagonal row.

My invention consists in providing an elongated shield plate 15 to be disposed on the right hand side of the spring tooth cultivator and to be mounted slightly above the lower terminals of the blades 10 as shown to advantage in Figure 1. This plate 15 is supported by means of an inverted L-shaped bracket A consisting of a long leg 16 and a relatively short leg 17. The short leg 17 is secured to the right hand end of the bar 9 by the right-handmost U-bolt 12 so that the leg 16 depends therefrom and is secured by a suitable bolt 18 to the forward end of the shield 15. The leg 16 of the bracket is formed with a pair of spaced holes 18', either one of which is adapted to receive the bolt 18 so that the shield can have its front end adjusted relative to the ground. An inverted L-shaped bracket B has the bottom end of its longer leg 19 riveted or otherwise secured as at 20 to an intermediate portion of the shield 15. The shorter leg 20' thereof is connected with the upper end of the long leg by a short transversely extending part and this leg 20' is formed with a longitudinally extending slot through which passes the shank of the right hand spring tooth of the cultivator, the parts being so constructed and arranged that the plate 15 can be adjusted upwardly or downwardly by the operator and the frictional engagement of the curved part of the spring shank 11 with the rear wall of the slot will hold the parts in adjusted position. Thus the shield forming plate may be vertically adjusted to regulate the amount of pulverized earth thrown up by the cultivator, passing under the shield plate to the plants in the row.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

In combination with a spring tooth cultivator, an elongated shield plate, a bracket connecting the front end of the plate to a part of the cultivator, a second bracket connected with an intermediate portion of the plate and having an upwardly extending portion and a rearwardly extending portion connected with the upper end of the upwardly extending portion, said rearwardly extending portion having an elongated slot therein through which the curved part of the shank of a spring tooth passes for frictionally engaging the rear end wall of the slot.

HENRY L. HUEY.